Nov. 21, 1961 C. P. FOREMAN 3,009,374
ECCENTRIC LIVE CENTER FOR TURNING LATHE
Filed Aug. 5, 1959 3 Sheets-Sheet 1
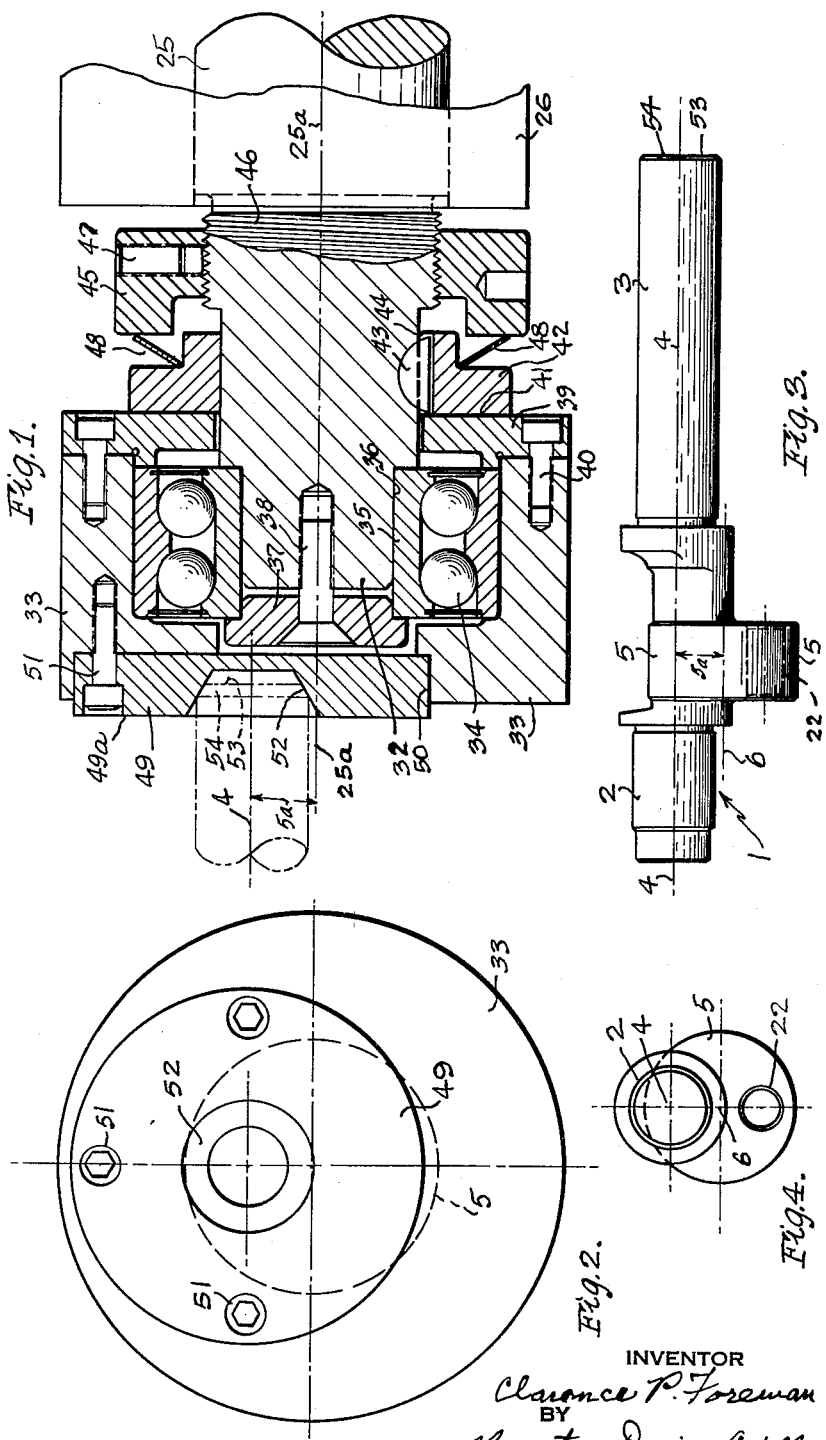
INVENTOR
Clarence P. Foreman
BY
Wooster, Davis & Cifelli
ATTORNEYS

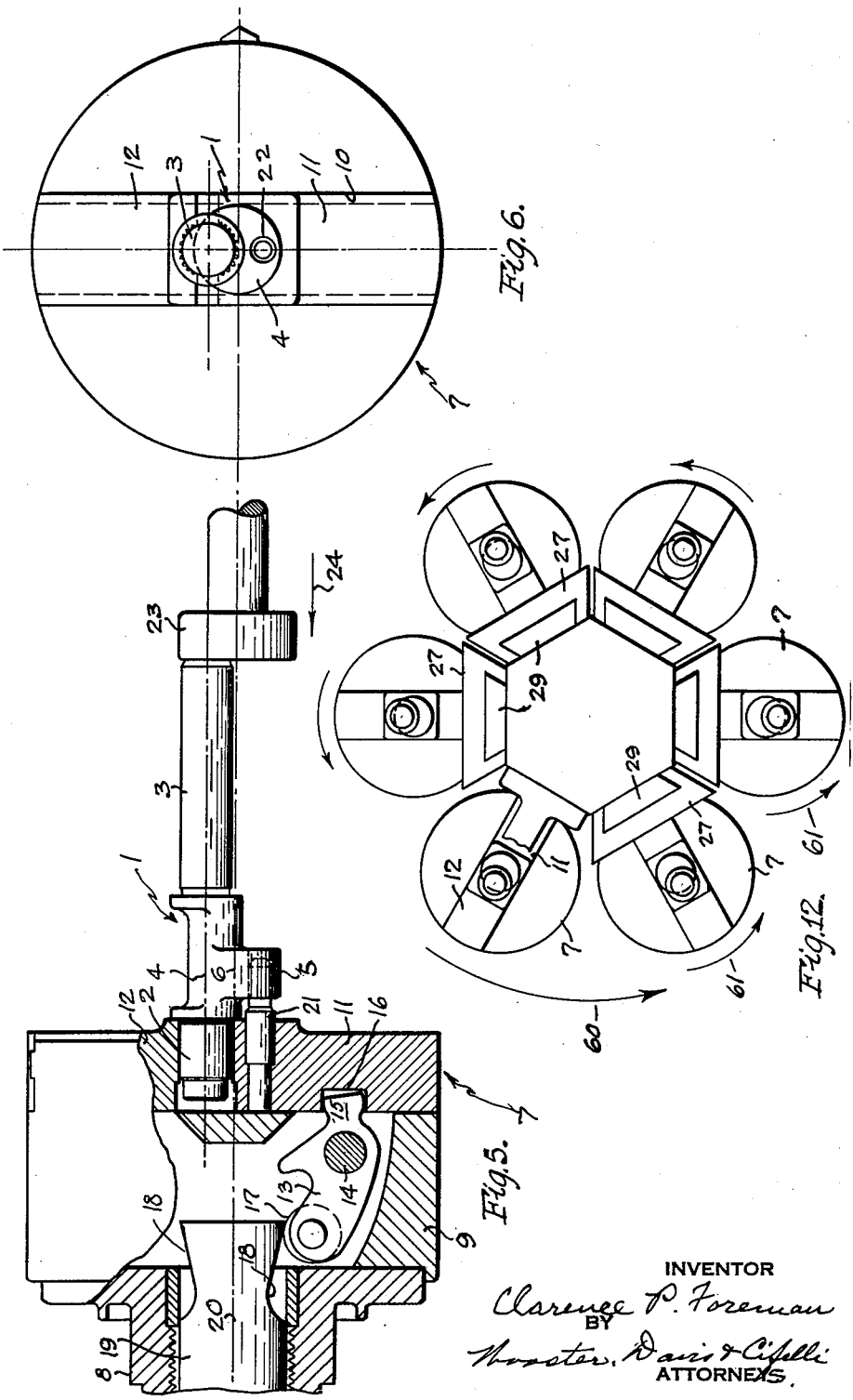

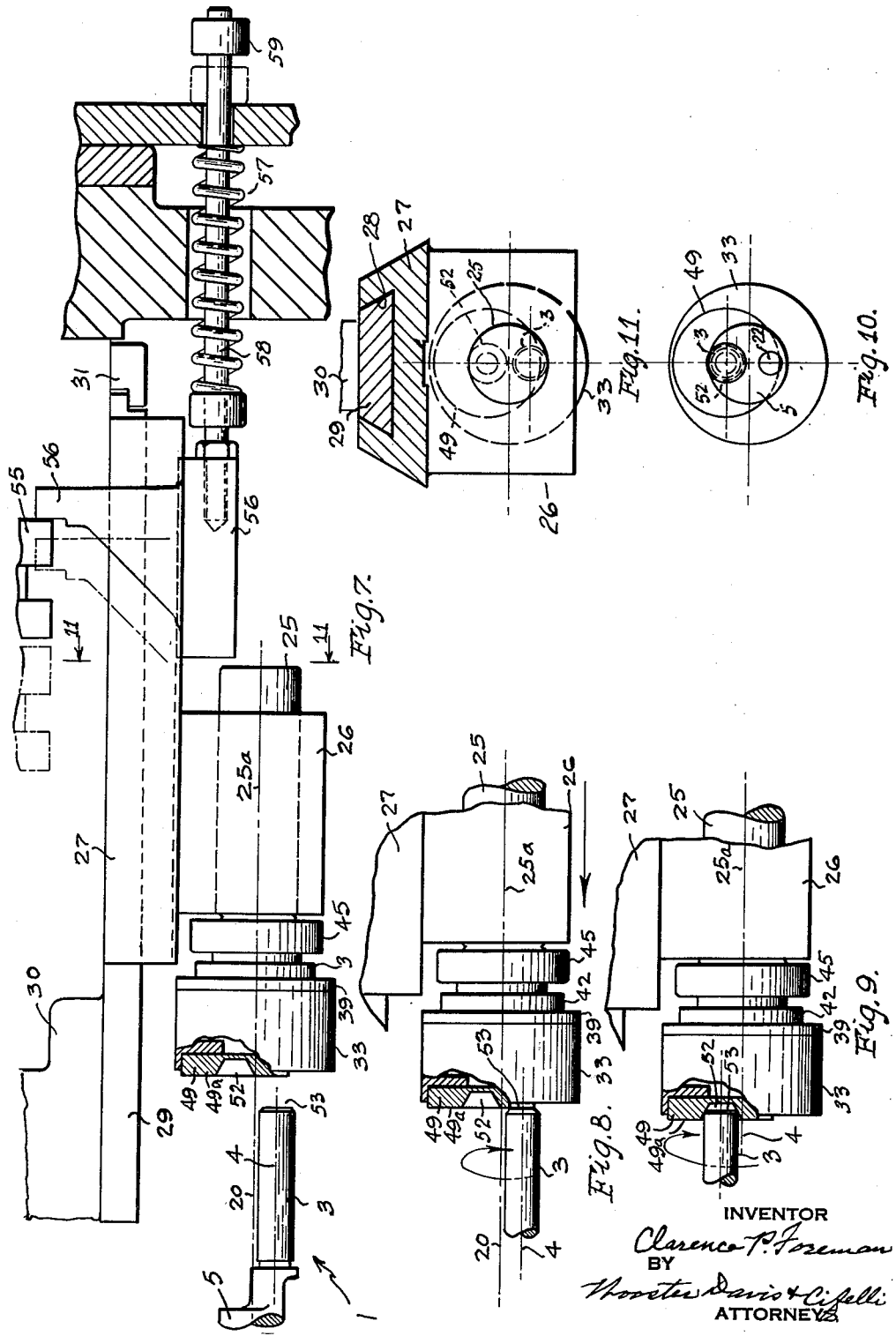

United States Patent Office 3,009,374
Patented Nov. 21, 1961

3,009,374
ECCENTRIC LIVE CENTER FOR TURNING LATHE
Clarence P. Foreman, Stratford, Conn., assignor to The Baird Machine Company, Stratford, Conn., a corporation of Connecticut
Filed Aug. 5, 1959, Ser. No. 831,782
9 Claims. (Cl. 82—33)

This invention relates to turning lathes and has for an object to provide an improved eccentric live center for such lathes whereby an eccentric bearing may be turned, such, for example, as that of an eccentric crank.

It is also an object to provide such a center which may be employed either on a single spindle hand controlled lathe or on such machines as a multi-spindle, indexing, automatic chucking machine.

Another object is to provide means whereby a work piece, on which an eccentric bearing is to be turned, may be mounted or chucked in a chuck on an operating or driving spindle at one side of the eccentric bearing, and will automatically find its opposite supporting center for supporting it on the other side of the eccentric bearing during the turning operation.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

FIG. 1 is a partial longitudinal section and partial side view of this improved center;

FIG. 2 is a front end view looking from the left of FIG. 1;

FIG. 3 is a side view of a work piece used as a sample to illustrate the objects and operation of this device;

FIG. 4 is an end view thereof looking from the left of FIG. 3, and

FIG. 5 is a partial section and partial side view showing the work piece mounted in the chuck for use with this center;

FIG. 6 is a view looking toward the chuck from the right of FIG. 5;

FIG. 7 is a partial plan view and partial section showing one way in which the center may be mounted and showing it in position before it is shifted toward the work piece;

FIG. 8 is a plan view of the center showing it shifted toward the work piece, and illustrating the position to which it may be taken before the work piece is properly centered;

FIG. 9 is a view similar to FIG. 8 showing the work piece properly centered;

FIG. 10 is an end view of the housing and the work piece in the position of FIG. 9;

FIG. 11 is a section substantially on line 11—11 of FIG. 7, and

FIG. 12 is a somewhat diagrammatical view of a portion of an indexing turret lathe with which this center may be used.

The work piece 1 shown in FIGS. 3 and 4, taken as an illustration to show how this device may be used, comprises a crank shaft such as may be used on various machines, for example, air compressors and similar machines, and comprises two aligned bearings 2 and 3 adapted to rotate about the center line or axis 4, and an eccentric bearing or crank portion 5 with its axis or center line 6 arranged laterally of and therefore eccentric to the axis or center line 4. As indicated above, it is an object of this invention to provide an improved means for properly supporting the work piece while turning the eccentric bearing 5, the aligned bearings 2 and 3 having first been turned in the usual manner, in a suitable lathe, for example. In turning the eccentric bearing or crank 5 the work piece must, of course, be rotated about the axis 6.

In FIGS. 5 and 6, the work piece 1 is shown in a chuck 7 on an operating spindle 8 in a suitable lathe or chucking machine. This may be a single spindle lathe, or it could be an indexing turret lathe or chucking machine, comprising a turret carrying a plurality of these spindles each mounting one of these chucks, as indicated diagrammatically, for example, in FIG. 12. This chuck includes a body or housing 9 provided with transverse channels 10 in its front face in which is mounted and guided for radial movement, a pair of jaws 11 and 12 for gripping and holding the work piece, in this case the bearing 2. These jaws may be shifted to and from work-gripping position by any suitable means, such, for example, as the operating levers 13 pivoted at 14, with an operating lug 15 seated in a recess 16 in the chuck jaw and a roller 17 operated by an inclined cam 18 on a control rod 19 operated by any suitable means (not shown). The jaws 11 and 12 are so arranged that they may grip the bearing 2 of the work piece, eccentrically or spaced at one side from the center line 20 of the chuck spindle and therefore the axis of rotation of the chuck, the distance equal to the eccentric spacing of the axis 6 of the eccentric bearing 5 from the axis 4 of the aligned bearings 2 and 3, as shown in FIGS. 5 and 6.

The chuck jaw 11 is provided with means to positively rotate the work piece with the chuck about the axis 20. In the illustration shown there is a driving pin 21 mounted in the chuck jaw and projecting forwardly therefrom and seated in an opening 22 in the eccentric bearing 4 and spaced laterally of the center axis 6 of this bearing. It will thus be seen, as shown in FIGS. 5 and 6, that the work piece is now mounted in the chuck with the axis of the eccentric bearing 5 in alignment with the axis 20 of the spindle 8 and the chuck 7. To assist in insuring that the work piece is properly located in the chuck jaws before these jaws are clamped onto the bearing 2, locating plunger 23 may be provided movable longitudinally toward and from the work piece, as indicated by the arrow 24, to engage the outer end of the work piece and press it to the proper position in the chuck, the plunger being operated by any suitable means (not shown) such, for example, as a hand lever or treadle or automatic means as used in an automatic indexing turret operating in timed relation with the indexing operation.

It is obviously desirable, in order to properly and accurately turn the eccentric bearing 4, that the outer end of the work piece be properly centered and supported during the turning operation, which is the object of the present invention. This center is shown in detail in FIGS. 1 and 2. It comprises a stationary or nonrotating shaft 25, which, however, is mounted for longitudinal movement by means of a block 26 in a slidable member 27 having a dovetail guide groove 28 on a similarly shaped slide or guide 29 supported on the machine by any suitable means, such as brackets 30 or other supports 31. The shaft may be mounted for longitudinal adjustment in the block 26 by any suitable means such, for example, as one or more set screws (not shown). The shaft 25 has a projecting end portion 32 on which there is mounted a rotatable housing 33 on suitable antifriction bearings such as the ball bearings 34, the inner raceway ring 35 being seated on a reduced diameter 36 in the shaft and being held therein by a retainer 37 and a suitable screw 38. On the rear side of the housing is mounted a friction plate 39 secured to the housing by any suitable means, such, for example, as the screws 40, and the friction surface 41 of this plate engages a similar surface on a friction collar 42 keyed to the shaft 25 so as to be held stationary on this shaft against rotation but with limited longitudinal movement. For this the key 43 is slidable in a groove 44 in the collar so that the collar has limited longitudinal movement on the shaft. Also mounted on the shaft is an adjusting and abutment nut 45 threaded on the shaft, as indicated at 46, for limited adjusting movement toward and from the collar 42, and it may be held in adjusted positions by any suitable means, such as set screws 47. Between the adjusting nut 45 and the collar 42 is a spring means 48 which may be a wavy spring washer, the adjusting collar and the adjusting nut 45 providing abutments for this washer so that it is compressed between this nut and the friction collar 42, and thus tends to press the friction collar against the friction surface 41 of the housing, and this pressure and the tension of the spring may be adjusted by adjusting the nut 45 on the shaft.

On its forward side the housing is provided with an insert 49, which in the present showing comprises a circular disk seated in a recess 50 in the base of the housing and has a front surface 49a in a plane at right angles to the axis 25a of the shaft. The insert is secured by any suitable means, such as the screws 51. It is mounted eccentrically in the housing and provided with an eccentric recess 52, which is shaped to provide a seat and support for the outer end 53 of the work piece. This recess is offset from the axis of rotation 20 and 25a a distance equal to the distance 5a (FIG. 3) the center or axis of the eccentric bearing 5 is offset from the axis 4 of the end bearings 2 and 3. To assist in properly seating the outer end of the work piece in this recess, it may be tapered, as shown in FIG. 1, and the end of the work piece may be correspondingly bevelled, as indicated at 54. In FIG. 12, arrow 60 indicates direction of rotation of the turret, and arrows 61 the direction of rotation of the chucks 7.

In operation, assuming the chuck 7 is at the loading station, for example, on an indexing turret lathe of the type shown in the patent to Lewis, No. 1,796,797, dated March 17, 1931, or if it is used on a single spindle machine, it would also be in the loading position, and at this position is a horizontally extending setting or locating bar 23 which may be retracted by the operator by any suitable means, such, for example, as a hand lever or foot treadle. This permits the operator to place one of these work pieces with its end bearing 2 between the offset jaws 11 and 12 of the chuck. As previously indicated, the two bearings 2 and 3, having already been turned to the proper size and on aligned axis 4. This member is placed in the chuck with the pin 21 in the longitudinal hole 22 in the eccentric portion of the work piece. Then the rod or positioning plunger 23 is shifted forwardly, either by a spring (not shown) or operation of the operator, which forces its free end against the end 53 of the work piece to insure that it is forced into the chuck to the proper position. Then the jaws of the chuck close, and if it is on an indexing turret lathe the turret is indexed to carry the work piece to the next station, at which is located the eccentric live center comprising the housing 33. If it is a single spindle lathe, there is no indexing, but this center is mounted on the tail stock in aligment with an opposite to the chuck.

As the spindle 8 and the chuck start to rotate, the live center is shifted toward the work piece by any suitable means. If it is being used on an automatic indexing lathe, it may be shifted by control means, such, for example, as cams, indicated diagrammatically at 55 in FIG. 7, cooperating with the lug bracket 56 on the carrier 27, and shifted forwardly by a spring 57 on a rod 58 secured to the bracket 56 and thus the carrier 27. As the center comprising the housing 33 is moved forwardly, the forward surface 49a is pressed against the end 53 of the work piece, as shown in FIG. 8, and is yieldably so held by the spring 57 and the spring washer 48. If the end of the work piece engages this surface out of alignment with the recess 52, as the spindle 8 and the chuck rotate the end of the work piece is rotated around the axis 20 eccentric thereto and slides on the surface 49a until it comes into alignment with the recess 52 in the end wall of the housing, and the springs then shift the center and housing 33 to cause this end of the work piece to center itself and seat in this recess, as shown in FIG. 9 and in broken lines in FIG. 1. During this movement of the work piece into alignment with the recess, the rotation of the housing 33 is retarded by the friction collar 42 engaging the friction surface 41 on the housing, but as soon as the end of the work piece seats in the recess, then the housing turns with it. In this position, the work piece and the housing 33 carrying the recess 52 are now rotating about the axis 6 of the eccentric bearing on the work piece, which is in alignment with the axis 20 of the chuck and the axis 25a of the live center. The tools for turning the eccentric bearing 4 are now brought into position for turning this bearing, and it will be seen it will be properly supported at both ends and turn on this eccentric axis. After this bearing is properly turned, the center is retracted by any suitable means, such, for example, as a lever 59 (FIG. 7) either operated manually or by automatic means 55 if these are indexing turret lathes. This will free the work piece either for removal from the chuck for insertion of another work piece to be turned, or if used in an indexing turret, for shifting to another station for other operations.

Having thus set forth the nature of my invention, I claim:

1. A live center for a lathe whereby one end of a work piece on which an eccentric bearing is to be turned may be supported to rotate about the center axis of said bearing; said center comprising means for supporting a free end of the work piece eccentric to said bearing including a support, a housing mounted on the support to rotate about an axis coaxial with that of the eccentric bearing, a front surface carried by said housing in a plane at right angles to its axis provided with a recess in which said free end of the work piece may be seated for support by the housing, said recess located eccentrically to the axis of the housing the distance the free end of the work piece is spaced laterally from the axis of the bearing, and a friction means adapted to retard free rotation of the housing until said free end of the work piece is seated in the recess and then permit rotation of the housing with the work piece about the axis of the eccentric bearing during turning of this bearing.

2. The combination of claim 1 in which there is means for shifting the housing toward the outer end of the work piece and holding said front surface of the housing against this end of the work piece until this end seats in the recess.

3. A live center for a lathe whereby one end of a work piece on which an eccentric bearing is to be turned may be supported to rotate about the center axis of said bearing; said center adapted for supporting a free outer end of the work piece eccentric to the bearing while turning the bearing comprising a stationary shaft in axial alignment with the center axis of the bearing, a housing mounted to rotate on the shaft including a front surface in a plane at right angles to the axis of the shaft provided with a recess in which the end of the work piece may be seated and supported by the housing, said recess located eccentrically to said axis of the shaft the amount the outer end of the work piece is spaced laterally of the axis of the eccentric bearing, and cooperating friction means on the shaft and housing adapted to retard free rotation of the housing until said free end of the work piece is seated in the recess and then permit rotation of the housing with the work piece about the axis of the shaft during turning of the bearing.

4. In combination, means for supporting a work piece comprising spaced aligned bearings at the ends thereof and an intermediate eccentric bearing, said means comprising a live center adapted to support the outer free end of the work piece while rotating about the center axis of the bearing including a support, a member mounted to rotate on the support about an axis in alignment with the axis of the eccentric bearing and provided with a surface facing the work piece and located at right angles to the axis of rotation, said member provided with a recess in said surface providing a seat for said free outer end of the work piece to support said end, said recess spaced laterally from the axis of rotation of said member a distance equal to the eccentricity of the eccentric bearing with relation to the end bearings of the work piece, means for shifting the live center toward the work piece to press the said surface against the end of the work piece, and a friction means adapted to retard rotation of the rotatable member until the end of the work piece is seated in the recess and then permit rotation of said member with the work piece.

5. A live center for a lathe whereby one end of a work piece on which an eccentric bearing is to be turned may be supported to rotate about the center axis of said bearing; said center adapted for supporting the outer free end of the work piece during the turning operation comprising a stationary shaft in axial alignment with the axis of the eccentric bearing, an adjusting nut threaded on the shaft for adjustment longitudinally thereof, a housing mounted to rotate on the shaft outwardly of the nut, a friction collar keyed to the shaft and adapted for limited longitudinal movement thereon, said housing and collar provided with engaging friction surfaces to retard but permit rotation of the housing, spring means between the adjusting nut and collar stressed to press the collar against the housing, a surface on the outer end of said housing facing the work piece and extending at right angles to the axis of the shaft, and a recess in said surface spaced laterally from the axis of the shaft an amount equal to the distance the free end is spaced laterally from the axis of the bearing and adapted to receive and support the outer end of the work piece during rotating of this work piece in the turning operation.

6. A live center for a turning lathe comprising a support, a housing mounted to rotate on the support, and a front surface carried by said housing in a plane at right angles to its axis of rotation provided with a recess located eccentrically to said axis, said recess providing an open seat adapted to receive and support the free end of a work piece during rotation of the housing on its support.

7. A live center for a turning lathe comprising a support, a housing mounted to rotate on the support, a front surface carried by said housing in a plane at right angles to its axis of rotation provided with a recess located eccentrically to said axis, said recess providing an open seat adapted to receive and support the free end of a work piece during rotation of the housing on its support, and a friction means for retarding free rotation of the housing on the support.

8. A live center for a turning lathe comprising a stationary shaft, a housing, a bearing on the shaft supporting the housing for rotation on the shaft, an abutment member on the shaft, a friction collar secured against turning on the shaft mounted for limited longitudinal movement on the shaft and provided with a friction surface, said housing provided with a friction surface engaging that of the collar, a spring means between the abutment member and the collar pressing the collar against the housing, a surface on the forward side of the housing opposite the friction surface located in a plane at right angles to the axis of the shaft, and said latter surface provided with a recess eccentric to the axis of the shaft providing an open seat adapted to receive and support the free end of a work piece during rotation of the housing on the shaft.

9. A live center according to claim 8 in which there is means for shifting the shaft and the housing toward the work piece to press the surface on the forward side of the housing against the end of the work piece, said means including a yieldable spring means.

References Cited in the file of this patent

UNITED STATES PATENTS

| | | |
|---|---|---|
| 1,098,654 | Wilder | June 2, 1914 |
| 2,426,376 | Smallpeice | Aug. 26, 1947 |
| 2,456,776 | Faust | Dec. 21, 1948 |